United States Patent [19]

Pyzik et al.

[11] Patent Number: 5,312,785
[45] Date of Patent: May 17, 1994

[54] SINTERED SELF-REINFORCED SILICON NITRIDE

[75] Inventors: Aleksander J. Pyzik; Harold E. Rossow, both of Midland, Mich.

[73] Assignee: The Dow Chemical Company, Midland, Mich.

[21] Appl. No.: 63,587

[22] Filed: May 18, 1993

[51] Int. Cl.⁵ .............................. C04B 35/58
[52] U.S. Cl. ......................... 501/97; 501/95; 501/98; 264/65
[58] Field of Search ............... 501/95, 97, 98; 264/65

[56] References Cited

U.S. PATENT DOCUMENTS

| | | | |
|---|---|---|---|
| 3,950,464 | 4/1976 | Masaki | 264/65 |
| 4,004,937 | 1/1977 | Masaki | 106/59 |
| 4,025,351 | 5/1977 | Masaki | 106/59 |
| 4,046,580 | 9/1977 | Ishii et al. | 106/55 |
| 4,097,293 | 6/1978 | Komeya et al. | 106/43 |
| 4,119,689 | 10/1978 | Prochazka et al. | 264/65 |
| 4,179,301 | 12/1979 | Buljan | 106/73.5 |
| 4,218,257 | 8/1980 | Oda et al. | 106/73.5 |
| 4,227,842 | 10/1980 | Samanta et al. | 409/131 |
| 4,279,657 | 7/1981 | Greskovich | 106/73.5 |
| 4,296,065 | 10/1981 | Ishii et al. | 264/325 |
| 4,323,325 | 4/1982 | Samanta et al. | 409/131 |
| 4,406,668 | 9/1983 | Sarin et al. | 51/295 |
| 4,407,970 | 10/1983 | Komatsu et al. | 501/97 |
| 4,511,402 | 4/1985 | Miura et al. | 75/233 |
| 4,511,525 | 4/1985 | Tsuge et al. | 264/65 |
| 4,543,345 | 9/1985 | Wei | 501/95 |
| 4,603,116 | 7/1986 | Smith et al. | 501/97 |
| 4,609,633 | 9/1986 | Fukuhara et al. | 501/97 |
| 4,622,186 | 11/1986 | Mizutani | 264/62 |
| 4,652,276 | 3/1987 | Burden | 51/308 |
| 4,699,890 | 10/1987 | Matsui | 501/98 |
| 4,717,693 | 1/1988 | Wittmer | 501/97 |
| 4,734,234 | 3/1988 | Sterzel | 264/66 |
| 4,753,764 | 4/1988 | Kamijo et al. | 264/63 |
| 4,801,565 | 1/1989 | Matsui | 501/98 |
| 4,820,665 | 4/1989 | Ukai et al. | 501/97 |
| 4,870,036 | 9/1989 | Yeh | 501/97 |
| 4,883,776 | 11/1989 | Pyzik et al. | 501/97 X |
| 4,891,342 | 1/1990 | Yokoyama | 501/97 |
| 4,919,689 | 4/1990 | Pyzik et al. | 501/97 X |
| 4,920,085 | 4/1990 | Yoshida et al. | 501/97 |
| 5,002,907 | 3/1991 | Hayakawa et al. | 501/97 |
| 5,015,608 | 5/1991 | Matshishia et al. | 501/97 |
| 5,017,531 | 5/1991 | Ukai et al. | 501/98 |
| 5,021,372 | 6/1991 | Pyzik et al. | 501/97 X |
| 5,091,397 | 2/1992 | Pyzik et al. | 501/97 X |
| 5,120,328 | 6/1992 | Pyzik | 51/309 |
| 5,188,780 | 2/1993 | Lange et al. | 264/63 |

FOREIGN PATENT DOCUMENTS

| | | | |
|---|---|---|---|
| 0100380 | 7/1982 | European Pat. Off. | 35/58 |
| 0079678 | 5/1983 | European Pat. Off. | 35/58 |
| 0228022 | 7/1987 | European Pat. Off. | 35/58 |
| 58-64274 | 4/1983 | Japan | 35/58 |
| 59-21413 | 2/1984 | Japan | 27/2 |
| 61-78657 | 4/1986 | Japan | 3/10 |
| 106430 | 5/1986 | Japan | 9/48 |
| 61-97167 | 7/1986 | Japan | . |
| 8908625 | 3/1989 | Japan | 35/58 |
| 9204180 | 12/1992 | PCT Int'l Appl. | . |

Primary Examiner—Karl Group

[57] ABSTRACT

A dense, self-reinforced silicon nitride ceramic body and a method of making such body. The body has a composition that includes: (a) silicon nitride; (b) a glassy grain boundary phase containing oxygen, nitrogen, magnesium, yttrium, silicon, zirconium, and at least one of titanium and aluminum; and (c) a second crystalline phase containing zirconium oxide; and (d) crystalline phases of metal zirconium silicide and/or metal zirconium silicon nitride. The ceramic exhibits high fracture toughness and high fracture strength and has a density of at least 98 percent of theoretical.

17 Claims, No Drawings

SINTERED SELF-REINFORCED SILICON NITRIDE

BACKGROUND OF THE INVENTION

This invention pertains to a sintered self-reinforced silicon nitride ceramic body and to compositions used in preparing the same.

Silicon nitride ceramics are recognized for their excellent mechanical and physical properties, including good wear resistance, low coefficient of thermal expansion, good thermal shock resistance, high creep resistance, and high electrical resistivity. In addition, silicon nitride ceramics resist chemical attack, particularly oxidation. Because of these attributes, silicon nitride is useful in a variety of wear and high temperature applications, such as cutting tools and parts in pumps and engines.

Typically, densification of silicon nitride requires the presence of densification aids, such as oxides of magnesium, yttrium, aluminum, cerium, silicon, and zirconium. A powder mixture comprising silicon nitride and one or more of such densification aids is usually prepared and heated under conditions described hereinafter. The densification aids form a liquid phase into which α-silicon nitride dissolves and from which it precipitates as β-silicon nitride.

The final density of a ceramic body depends largely on the density of the body before heat is applied. This is often referred to as "green density," and the body is referred to as "greenware." The most common method of forming greenware is dry pressing. However, a problem with dry pressing is that it does not favor forming large and complex shaped bodies. In addition, forming greenware by dry pressing typically results in low density parts with non-uniform distributions of porosity. The non-uniformity generally relates to a higher density at the edge of a ceramic part than in the center. Further, binders, used to process the bodies into their near net shapes, usually have to be removed. De-bindering is a long and difficult process that often leads to development of internal cracks within the body.

An alternative method of forming ceramic greenware is by colloidal processing, such as slip-casting. An advantage of colloidal processing is that large, complex shaped, high density greenware can be produced without the use of binders. A second advantage is that aqueous carrier media may be used, eliminating the need for more expensive or potentially environmentally hazardous processing conditions. Notwithstanding these advantages, colloidal processing has one major disadvantage in that as the number of components in a formulation increases, it becomes more difficult to find common colloidal processing conditions. This is because every component has different surface characteristics, and these characteristics determine the conditions in which colloidal processing will work. Thus, for many multi-component ceramic compositions, it is difficult to form ceramic greenware by colloidal processing.

Typically, in order to obtain substantially full densification of the aforementioned powder mixture or greenware, one of four general methods is used: hot pressing (HP), hot isostatic pressing (HIP), pressure-less sintering, or low pressure gas sintering. Densification of silicon nitride alone normally does not go to completion in the absence of high pressure. For example, the density of the silicon nitride ceramic body might only reach 80 or 90 percent of its theoretical value. Whereas a density of at least 98 percent is required to achieve a ceramic having excellent mechanical and physical properties, such as high fracture strength and high fracture toughness. Further, at high temperatures and low pressures, silicon nitride decomposes into elemental silicon and nitrogen. Thus, the commercial need for fully densified silicon nitride ceramics, having excellent fracture strength and fracture toughness, is currently met predominantly by using HP or HIP to densify combinations of silicon nitride and densification aids.

Disadvantageously, however, the HP and HIP methods require complicated high pressure equipment and typically yield only a ceramic having a simple shape. In order to obtain a more complicated net shape, the densified HP or HIP ceramic typically must be subjected to post-densification procedures such as diamond grinding. Although more complicated shapes may be obtained by pressureless or low pressure gas sintering, these methods typically present difficulties in obtaining ceramic bodies of substantially full density having high fracture strength and toughness.

SUMMARY OF THE INVENTION

In one aspect, this invention is a process for preparing a dense, self-reinforced silicon nitride ceramic body by pressureless or low pressure gas sintering. The process comprises subjecting a powder mixture including:

(a) silicon nitride in an amount sufficient to provide a ceramic body;

(b) a combination of a source of magnesium oxide and a source of silicon dioxide, the silicon dioxide being present in an amount sufficient to provide a total silicon dioxide content of at least 3 weight percent, and the combination being present in an amount sufficient to aid densification of the powder;

(c) a source of yttrium oxide in an amount sufficient to promote essentially complete conversion of the silicon nitride to β-silicon nitride;

(d) a catalytic amount of a source of zirconium oxide; and (e) at least one whisker growth enhancing compound in an amount sufficient to promote the formation of β-silicon nitride whiskers, said compound(s) being selected from the group consisting of a source of titanium dioxide and a source of aluminum oxide;

to a pressure within a range of from 1 atmosphere (0.1 MPa) to 100 atmospheres (10 MPa) and to a temperature sufficient to provide for densification to a value which is at least 98 percent of theoretical. In addition, the conditions of temperature and pressure are sufficient to provide in situ formation of β-silicon nitride whiskers having a high average aspect ratio. In this manner, a dense, self-reinforced, silicon nitride ceramic body having a fracture toughness greater than about 6.0 MPa.(m)$^{\frac{1}{2}}$ as measured by the Chevron notch technique at 23° C., is formed.

Advantageously, the process of this invention provides a fully densified, or nearly fully densified, silicon nitride ceramic body by pressureless or low pressure sintering. By "nearly fully densified" it is meant that the density of the sintered body is at least 98 percent of the theoretical value. By "fully densified" it is meant that the density of the sintered body is at least 99.5 percent of the theoretical value. More advantageously, the pressureless and low pressure processes of this invention reduce the need for high pressure equipment, eliminate the need for diamond grinding, and readily provide complicated near net shapes in large numbers.

In a second aspect, this invention further comprises a step of forming the powder mixture into greenware prior to sintering. Under this step, the greenware may be formed out of a colloidal suspension comprising the powder mixture dispersed in an aqueous carrier medium, wherein each component of the powder mixture is water dispersible and nonflocculating.

In a third aspect, this invention is a silicon nitride ceramic body having a density which is at least 98 percent of theoretical value and a toughness greater than about 6.0 MPa.(m)$^{\frac{1}{2}}$, as measured by the Chevron notch technique at 23° C. This silicon nitride body comprises:

(a) a crystalline phase of β-silicon nitride of which at least about 20 volume percent, as measured by viewing one plane of the silicon nitride ceramic body by scanning electron microscopy, is present as whiskers having an average aspect ratio of at least about 2.5;

(b) a glassy grain boundary phase, in an amount ranging from about 2 to about 10 weight percent, based on total weight of the composition, comprising oxygen, nitrogen, magnesium, yttrium, silicon, zirconium, and at least one metal selected from the group consisting of titanium and aluminum;

(c) a second crystalline phase comprising zirconium oxide, in an amount ranging from about 0.1 to about 3.0 weight percent based on total weight of the composition; and (d) at least one additional crystalline phase in an amount ranging from 0.1 to about 3.0 weight percent based on total weight of the composition, the additional phase(s) comprising metal zirconium silicide and metal zirconium silicon nitride, wherein the metal is selected from the group consisting of titanium and aluminum.

In a fourth aspect, this invention is an article of manufacture formed from the above-identified silicon nitride ceramic body. Examples of possible articles of manufacture are cutting tools and parts in pumps and engines. Articles of manufacture suitable for use in other wear or high temperature applications or end uses are readily determined by skilled artisans without undue experimentation.

DETAILED DESCRIPTION OF THE INVENTION

The silicon nitride starting material used in preparing the ceramic body of this invention can be any silicon nitride powder, including the crystalline forms of α-silicon nitride and β-silicon nitride, or noncrystalline amorphous silicon nitride, or mixtures thereof. However, the preferred form of silicon nitride powder has a high purity and a high α/β weight ratio, as disclosed in Pyzik, U.S. Pat. No. 5,120,328, col. 4, lines 13-37, 48-58. For the purposes of this invention, a "high" average aspect ratio means an average aspect ratio of at least about 2.5. This cited section of Pyzik, and all sections cited hereinafter, are incorporated herein by reference. In addition, the powder is of any size or surface area provided the dense, self-reinforced ceramic body of this invention is obtained. Preferably, the particles have an average diameter within a range of from about 0.2 μm to about 5.0 μm; more preferably, from about 0.2 μm to about 1.0 μm. The powder has a surface area that is desirably within a range of from about 5 m$^2$/g to about 15 m$^2$/g, as determined by the Brunauer-Emmett-Teller (BET) method of measuring surface area, which is described in C. N. Satterfield, *Heterogeneous Catalysis in Practice* 102-05 (McGraw-Hill Book Company, 1980). The range is preferably from about 8 m$^2$/g to about 12 m$^2$/g.

Oxygen is present to some extent in the form of silicon dioxide (silica), usually as a coating on the surface of silicon nitride particles. The amount of silica varies according to the purity of the starting silicon nitride powder and its method of manufacture. Typically, the concentration of silica, introduced naturally through the silicon nitride powder, ranges from about 1.5 to about 4.0 weight percent (wt-%), based on the total weight of the powder mixture. Preferably, silica content is from about 3.0 wt-% to about 5.0 wt-%. Most preferably, the silica content is from about 3.7 wt-% to about 4.2 wt-%. These amounts of silica are beneficial and, as will be discussed infra, aid in densification of the ceramic composition. Typically, if the silica content in the silicon nitride is less than 3.0 wt-%, additional silica should be added.

The silicon nitride is present in an amount which is suitably in a range from about 90 wt-% to about 98 wt-% based on the total weight of the powder mixture. The range is desirably from about 90 to about 98 wt-% for low pressure gas sintering, and from about 92 to about 97 wt-% for pressureless sintering. Preferably, the range is about 92 to about 97 wt-% for low pressure gas sintering, and from about 93 to about 96 wt-% for pressureless sintering.

A source of silica and a source of magnesium oxide (magnesia) are suitably employed as densification aids in the process of this invention. For purposes of this invention, "source" refers to a starting material that is either a desired component of the ceramic body, or a starting material that converts to the desired component under process conditions. For example, a source of magnesia may be magnesia or any starting material that converts to magnesia under process conditions. A specific process condition may influence selection of a particular source. For example, when using a colloidal suspension process with an aqueous carrier medium, a water dispersible, nonflocculating source of magnesia, such as magnesim hydroxide, is preferred. During densification of the powdered mixture formed out of the colloidal suspension of this example, magnesium hydroxide converts to magnesia. A "source" may also consist of more than one starting material, as long as the desired component is obtained under process conditions.

Silica and magnesia function as densification aids because a resulting silica and magnesia containing glass forms a liquid phase at a temperature between about 1300° C. and 1500° C. into which α-silicon nitride dissolves. Depending upon the amount of silica already introduced naturally through the silicon nitride powder (discussed supra), an additional amount of silica may be added to the composition. Typically, when the amount of silica introduced from the silicon nitride powder is less than 3.0 wt-%, additional silica should be added to the composition. The total amount of silica is desirably in the range from 3.0 wt-% to 5.0 wt-%. Preferably, the total amount of silica is in the range from 3.7 wt-% to 4.2 wt-%.

Any amount of a source of magnesia which, in conjunction with the silica, produces, by pressureless or low pressure gas sintering, the dense, self-reinforced silicon nitride ceramic body of the invention is acceptable. For example, if the source of magnesia is magnesium hydroxide, each weight percent of magnesium hydroxide added to the composition is equal to 0.691 wt-% of magnesia. Magnesia is suitably present in an amount within a range of from about 0.5 to about 3.0 wt-% based on the powder mixture total weight (0.7 to 4.3 wt-% magnesium hydroxide). Preferably, magnesia is present in an amount within a range of from about 0.7 wt-% to about 2.5 wt-% (1.0 to 3.6 wt-% magnesium hydroxide), and more preferably, from about 0.9 wt-% to about 2.0 wt-% (1.3 to 2.9 wt-% magnesium hydroxide). The total amount of densification aid (silica and magnesia), including the silica present in the silicon nitride, should be within a range of from about 3.5 wt-% to about 8.0 wt-% based on the total weight of the powder mixture. The range is preferably from about 4.6 wt-% to about 6.2 wt-%.

In addition to densification aids, the powder mixture must contain a conversion aid. A source of yttrium oxide (yttria) is a desirable conversion aid. The source of yttria may be either yttria or a starting material that converts to yttria under process conditions. As disclosed in Pyzik, U.S. Pat. No. 5,120,328, col. 5, lines 34–52, the conversion aid promotes the rapid, essentially complete conversion of $\alpha$-silicon nitride to $\beta$-silicon nitride. This conversion is most desirable because $\beta$-silicon nitride, in the form of elongated, single crystal whiskers or grains, is important for obtaining the high fracture toughness and high fracture strength of the silicon nitride ceramic body of this invention. All references hereinafter to silicon nitride whiskers, single crystal whiskers and single crystal silicon nitride whiskers are intended to be synonymous and may be used interchangeably.

A source of yttria can be employed in any amount, and in any ratio to the densification aids, providing the amount and ratio are sufficient to cause the essentially complete conversion of the starting silicon nitride to $\beta$-silicon nitride and produce the dense, self-reinforced silicon nitride ceramic body of the invention by pressureless or low pressure gas sintering. Desirably, the amount of yttria yielded from the source of yttria is within a range of from about 1.0 wt-% to about 6.0 wt-% based on the total weight of the powder mixture. More preferably, the range is from about 2 wt-% to about 4 wt-%. The weight ratio of yttria to the combination of magnesia and silica is preferably within a range of from about 2:1 to about 1:8.

The third component required to be present in the powder mixture is a source of a catalytic amount of zirconium oxide (zirconia). The source of zirconia may be zirconia or any starting material that converts to zirconia under process conditions. Zirconia, as disclosed in Pyzik, U.S. Pat. No. 5,120,328, col. 6, lines 14–33, functions in a multi-fold manner and is therefore referred to as a "catalyst" for purposes of this invention. For example, zirconia catalyzes the formation of elongated $\beta$-silicon nitride whiskers, acts as a densification aid, and acts as a "getter" for metallic impurities, thereby cleaning the glassy phase.

Any catalytic amount of a source of zirconia is acceptable provided it is sufficient to achieve its catalytic functions and provide the dense, self-reinforced silicon nitride composition of this invention by pressureless or low pressure gas sintering. The amount of zirconia yielded from the source of zirconia suitably ranges from about 0.1 wt-% to about 3.0 wt-% based on the total weight of the powder mixture. Preferably, the amount ranges from about 0.2 wt-% to about 1.0 wt-%. This amount of zirconia can be added to the powder mixture directly, or can be obtained from the use of zirconia balls during attrition mixing of the other powder components. Under typical attrition mixing process conditions of 250 revolutions per minute (rpm) for about one hour, the amount of zirconia introduced is about 0.5 wt-%.

A densification aid (combination of magnesia and silica) to zirconia weight ratio may be any which produces the dense, self-reinforced silicon nitride composition of this invention. The weight ratio is preferably within a range of from about 40:1 to about 1:1. If the weight ratio falls outside of this range, the final density of the ceramic body is typically reduced.

The fourth component is a whisker growth enhancing compound. As disclosed in Pyzik, U.S. Pat. No. 5,120,328, col. 7, lines 5–44, this compound helps to provide a ceramic body of superior fracture toughness and fracture strength. In Pyzik, U.S. Pat. No. 4,883,776, the presence of calcium, particularly calcium oxide, was found to provide advantages as a whisker growth enhancing compound when silicon nitride powder compositions were hot-pressed into finished ceramic bodies. Subsequently, in Pyzik, U.S. Pat. No. 5,120,328, calcium oxide, tantalum oxide, hafnium oxide, gallium oxide, and indium oxide, were found to promote growth of $\beta$-silicon nitride whiskers during pressureless sintering, or low pressure gas sintering, of silicon nitride ceramic bodies.

It has now been discovered that compounds other than oxides of calcium, tantalum, hafnium, gallium, and indium may be employed to promote whisker growth. The discovery is that titanium dioxide (titania) and aluminum oxide (alumina) also promote growth of $\beta$-silicon nitride whiskers during pressureless or low pressure gas sintering. These compounds can be used as whisker growth enhancing compounds either by themselves, or in combination as a mixture. Using these whisker growth enhancing compounds, ceramic bodies having a fracture toughness greater than about 6 MPa.(m)$^{\frac{1}{2}}$, as measured by the Chevron Notch Test, are obtained.

Any amount of whisker growth enhancing compound source(s) is acceptable provided it is sufficient to promote the formation of $\beta$-silicon nitride whiskers, described hereinbelow, and produce the dense, self-reinforced silicon nitride ceramic body of this invention by pressureless or low pressure gas sintering. The source(s) may be titania, alumina, a mixture of titania and alumina, or any starting material that converts to at least one of these compounds under process conditions. Suitably, the amount of the source is within a range sufficient to yield from about 0.01 wt-% to about 3.0 wt-% of whisker growth enhancing compound, based on the total weight of the powder mixture. The range is preferably from about 0.1 wt-% to about 1.0 wt-%, more preferably, from about 0.15 wt-% to about 0.5 wt-%.

It is desirable to use sources of magnesia, silica, yttria, zirconia, and alumina and/or titania in the form of powders which are pure and sufficiently small in size. As disclosed in Pyzik, U.S. Pat. No. 5,120,328, col. 7, line 55 to col. 8, line 2, larger amounts of impurities, as for example in the 0.5 wt-% range, are not recommended as they may cause a change in the final ceramic composition and properties. In addition, a small powder particle size is favored, preferably having an average particle size no greater than about 5 $\mu$m in diameter. Most preferably, the powders have an average particle size no greater than about 1 $\mu$m in diameter.

In the process of this invention, the starting silicon nitride powder, described supra, is mixed with a combination of the densification aid(s), conversion aid, zirconia catalyst, and whisker growth enhancing compound(s) to obtain a mixture which is used in preparing the densified, tough silicon nitride ceramic body of this invention. It has now been discovered that each component of the mixture may also be derived from many different sources as long as the sources are converted to the respective components under process conditions. For example, one source of an oxide component may be difficult to introduce to an aqueous carrier medium, being nondispersible and causing flocculation. A different source of the same oxide component may, however, be water dispersible and nonflocculating. Thus, it is desirable to determine for each component which source may be introduced in combination with other components to obtain effective dispersion of the components without incurring an undesirable amount of flocculation. For example, as discussed supra, magnesium hydroxide, a source of magnesia, is water dispersible and nonflocculating, whereas magnesia itself flocculates in water. Although this list is not meant to be exhaustive, other examples may be calcium silicate as a source of silica, calcium zirconate or silicon zirconate as a source of zirconia, aluminum hydroxide as a source of alumina, and calcium titanate or titanium silicate as sources of titania. The introduction of calcium, by means of the above described compositions, is also advantageous, since it introduces an additional glass component into the composition, and is useful as a whisker growth enhancing compound in conjunction with at least one compound selected from the group consisting of alumina and titania.

The total quantity of components other than silicon nitride depends on desired end use applications for the sintered ceramics prepared from the powder mixture. Those skilled in the art recognize that, although the above identified sources of oxide components are used, some of the products derived from these sources under process conditions may also be nonoxide derivatives of magnesium, silicon, yttrium, zirconium, and at least one compound selected from the group consisting of aluminum and titanium. This is acceptable as long as it results in an adequate oxide content and does not adversely affect properties of the resultant sintered body. Ordinarily, the total quantity of magnesia, silica, yttria, zirconia, and whisker growth enhancing compound is no greater than about 10 wt-% of the total weight of the powder mixture. As discussed supra, if a source is used that is different from the oxide component, one skilled in the art can calculate the amount of oxide component that will be derived from the source. Preferably, however, the total quantity of oxide components after process conditions is within a range of from about 3 wt-% to about 7 wt-%.

The preparation of a finely-divided powder mixture containing silicon nitride, and sources of magnesia, silica, yttria, zirconia, and whisker growth enhancing compound(s) is accomplished in any suitable manner with conventional apparatus. Ball or attrition-milling of the components in powder form is an acceptable manner of preparation. If zirconia balls are used as milling media, powdered zirconia may not need to be added to the powder mixture, depending on the amount of zirconia required by the composition, because it is obtained from the zirconia balls. After attrition-milling, the attritor balls are removed, and any conventional method of forming the composition into presintering greenware may be utilized.

Generally, it is advantageous to prepare the above described silicon nitride composition by use of a carrier medium. The solid powders and a carrier medium form a solid suspension having a viscosity suitable for mixing. Preparation of the above described composition in a carrier medium requires no particular order of addition of the components. For example, it is possible to add the powdered combination or one or more individual components thereof to a colloidal suspension of silicon nitride in the carrier medium or vice versa. Alternatively, all components of the powder mixture may be added simultaneously to the carrier medium prior to attrition-milling. The process is typically conducted in a large vessel at room temperature (taken as 23° C.), under air, with vigorous stirring. This is one method of deagglomeration mixing, but any common stirring means is suitable, such as the above described ball-milling device or attrition mixer. An ultrasonic vibrator may be used in a supplementary manner to break down smaller agglomerates. However, the attrition mixer is preferred.

The carrier medium may be any inorganic or organic compound that is a liquid at room temperature and atmospheric pressure and in which the powdered sources of the components can be dispersed. Any quantity of carrier medium that achieves its purpose is sufficient and acceptable. Suitably, the carrier medium is aqueous and is employed in a quantity sufficient to provide a solids content within a range of from about 15 volume percent to about 50 volume percent. Preferably, the range is from about 35 volume percent to about 44 volume percent. Below the 15 volume percent lower limit, the viscosity of the solid suspension may be too low and deagglomeration mixing may be ineffective. Above the 50 volume percent upper limit, the viscosity may be too high and deagglomeration mixing may be difficult.

To aid in dispersing components of the powder mixture into the carrier medium, one or more surfactants or dispersants may be added to the suspension. The choice of surfactant(s) or dispersant(s) can vary widely as is well-known in the art. Any surfactant or dispersant is acceptable if it improves dispersion of the powder mixture components and does not adversely affect other process conditions or characteristics of the resultant product. Preferably, the surfactant for an aqueous carrier medium is KV 5088 (Zschimmer & Schwarz). With an aqueous-KV 5088 carrier medium, a colloidal suspension can be slip-cast or pressure cast to a green density above 55 percent of theoretical. In contrast, when using an alcohol carrier medium such as methanol, the KV 5088 dispersant is not advantageously used. Instead, a flocculant such as oleic acid may be used to ease recovery of the powder mixture. In this case, colloidal processing, such as slip-casting, is usually not used because the density of the resulting greenware is believed to be too low. When an alcohol carrier medium is used, the powder is preferably dried, sieved, and dry-pressed into greenware.

Any amount of surfactant or dispersant is acceptable provided dispersion of the powder mixture components is improved. The amount of surfactant is typically within a range of from about 0.01 to 1.5 wt-% of the powder mixture. When using the preferred aqueous carrier medium, the preferred amount of KV 5088 surfactant is within a range of from about 0.5 to 1.5 wt-% of the powder mixture. Most preferably, the amount of KV 5088 surfactant is between 0.7 and 1.2 wt-% of the powder mixture.

Once the silicon nitride, and sources of magnesia, silica, yttria, zirconia, and whisker growth enhancing compound(s) are finely-divided and dispersed, they may be formed into greenware. As discussed supra, slip-casting is a preferred method of forming the greenware into complex geometric shapes when a carrier medium is used. After slip-casting, the greenware is further dried under standard drying conditions. During the drying process, additional free carrier medium is removed. The drying temperature depends on the boiling point of the carrier medium employed. Drying is typically conducted at a temperature below the boiling point of the carrier medium under atmospheric pressure. For example, drying of greenware when an aqueous carrier medium has been employed is conducted by gradually heating the greenware to a temperature of about 80° C. and remaining at that temperature for about 24 hours. For methanol, the same procedure is conducted, but the maximum temperature should be between about 60° C. and 70° C. A desirable green density obtained from the slip-casting method is greater than 55 percent of theoretical density. However, this is dependent upon the volume percent of solids in the suspension.

Any other appropriate method for processing the composition into greenware may also be used. For example, an alternative to slip-casting would be to simply dry the suspension into a powder, grind it, pour it into a mold of the desired shape, and dry press. This process is disclosed in Pyzik, U.S. Pat. No. 5,120,328, col. 9, lines 31–65.

Any standard equipment suitable for pressureless or low pressure gas sintering is acceptable provided it yields the dense, self-reinforced silicon nitride ceramic of this invention. Those skilled in the art will recognize that pressureless and low pressure gas sintering are difficult densification methods and that compositions which can be densified by these methods may also be densified by hot pressing (HP) or hot isostatic pressing (HIP). Standard equipment and pressure conditions for pressureless and low pressure gas sintering are disclosed in Pyzik, U.S. Pat. No. 5,120,328, col. 10, lines 1–19. Typically, the greenware is placed into a graphite or boron nitride crucible containing a silicon nitride powder bed, or more preferably, a powder bed of silicon nitride and oxides of the same metal components present in the greenware (magnesia, silica, yttria, zirconia, and at least one of either titania or alumina). The pressure typically ranges from about 1 atmosphere (atm) (0.1 MPa) to about 100 atm (10 MPa).

Any sintering temperature and amount of time at the sintering temperature will suffice provided the dense, self-reinforced silicon nitride ceramic of this invention is formed. For purposes of this invention, suitable sintering temperatures and amounts of time at these temperatures are disclosed in Pyzik, U.S. Pat. No. 5,120,328, col. 10, lines 20–56. The sintering temperatures preferably range from about 1650° C. to about 1825° C., more preferably, from about 1700° C. to about 1750° C. Typically, it takes from about 2 hours to about 3 hours to heat the sample up to the sintering temperature. At the desired sintering temperature, the sample is preferably sintered for a period of from about 3 hours to about 36 hours, more preferably from about 12 hours to about 15 hours. Afterwards, the sample is cooled to room temperature over a period of about 2 hours. Some variation in the preferred temperature range may be observed depending on the method employed in measuring the temperature. The above sintering temperatures are measured by use of a tungsten-rhenium thermocouple obtained from, and calibrated by, the Omega Company.

The pressureless sintering and low pressure gas sintering methods described hereinbefore allow for the formation of various silicon nitride ceramic articles of manufacture such as cutting tools or parts in pumps and engines. A variety of shapes, such as flat plates or tubes, can be prepared. In addition, using a colloidal suspension, articles of manufacture can be fabricated by slip-casting into greenware having a variety of shapes. The subsequent pressureless and low pressure sintering methods of this invention typically do not require any slicing or grinding of the slip cast to obtain the substantially fully dense near-net shape.

The silicon nitride ceramic body produced by the process of this invention is a dense material having no significant porosity. Preferably, densification proceeds to a density of greater than 98 percent of theoretical; more preferably, to greater than 99 percent of theoretical; and most preferably, to greater than 99.5 percent of theoretical. Those skilled in the art will recognize that the theoretical density will vary depending upon the composition of the ceramic.

As measured by X-ray diffraction, the silicon nitride in the densified ceramic body is present in the beta crystalline form, indicating essentially complete alpha to beta conversion during processing. The $\beta$-silicon nitride is present predominately as single crystal, "needle-like" whiskers or elongated grains, as determined by both scanning electron microscopy (SEM) and transmission electron microscopy (TEM). The size of the $\beta$-silicon nitride grains is usually in a range of from about 1 $\mu$m to about 20 $\mu$m in length with a mean diameter of from about 0.2 $\mu$m to about 5.0 $\mu$m; preferably, with a mean diameter of from about 0.3 $\mu$m to about 1.0 $\mu$m.

As disclosed in Pyzik, U.S. Pat. No. 5,120,328, col. 11, lines 29–54, and measured by SEM, the whiskers are oriented randomly, and the volume occupied by the whiskers is approximately the same in all planes throughout the ceramic body. Typically, the percentage of silicon nitride whiskers having an aspect ratio of between about 2 and 16 is at least about 20 volume percent as measured in a plane. Preferably, the percentage of silicon nitride whiskers having an aspect ratio between about 2 and 16 is at least about 35 volume percent as measured in a plane. The average aspect ratio of the silicon nitride whiskers is at least about 2.5, preferably, at least about 4.0.

In addition to a silicon nitride crystalline phase, the body of this invention contains a glassy grain boundary phase in an amount ranging from about 2 wt-% to about 10 wt-% of the total weight of the body. Preferably, the amount ranges from about 5 wt-% to about 7 wt-% of total body weight. The glassy phase comprises oxygen, nitrogen, magnesium, yttrium, silicon, zirconium, and at least one metal selected from the group consisting of titanium and aluminum. In the glassy phase, the elements may be bonded in any number of different ways including: metal oxides, metal nitrides, metal oxynitrides, mixed metal oxides, mixed metal nitrides, and mixed metal oxynitrides, wherein the metals are selected from the group consisting of magnesium, yttrium, silicon, zinconium, titanium, and aluminum.

Additionally, the body of this invention contains a second crystalline phase in an amount suitably ranging from about 0.1 wt-% to about 5.0 wt-% of total body weight. The second crystalline phase is zirconia. Two other crystalline phases may also be present an amount totaling not more than about 2.0 wt-%. Specifically, these other crystalline phases comprise metal zirconium silicide and metal zirconium silicon nitride. The metal is at least one of titanium or aluminum.

The mechanical properties of the self-reinforced silicon nitride ceramic body of this invention are readily measured by use of standard tests. In particular, fracture toughness ($K_{IC}$) is measured according to the Chevron notch and the Palmqvist methods. Fracture strength (modulus of rupture) is measured according to the Military Standard 1942b test. Hardness is measured according to the Vickers indentation test. These standard tests are thoroughly discussed in Pyzik, U.S. Pat. No. 5,120,328, col. 12, line 64 to col. 14, line 24.

Fracture strength (modulus of rupture) measures the resistance of the material to fracture under a load. Typically, the fracture strength at room temperature is at least about 95 ksi (650 MPa). Preferably, the fracture strength at room temperature ranges from about 116 ksi (800 MPa) to about 130 ksi (900 MPa). Typically, at 1200° C. the fracture strength is at least about 65 ksi (450 MPa).

Toughness measures the resistance of the material to fracture under a dynamic load. Typically, the fracture toughness of the silicon nitride ceramic body of this invention, as measured at room temperature (taken as 23° C.) by the Chevron notch technique, is greater than about 6 MPa.(m)$^{178}$. Preferably, the room temperature fracture toughness is greater than about 7 MPa.(m)$^{\frac{1}{2}}$; more preferably, greater than about 7.5 MPa.(m)$^{178}$. Most preferably, the room temperature fracture toughness is higher than 7.8 MPa.(m)$^{\frac{1}{2}}$.

The Vickers hardness test measures the resistance of a ceramic material to indentation. The room temperature Vickers hardness of the silicon nitride ceramic bodies of this invention is at least about 1400 kg/mm$^2$ at room temperature. Preferably, the Vickers hardness number ranges from about 1425 kg/mm$^2$ to about 1600 kg/mm$^2$ at room temperature; more preferably, from about 1450 kg/mm$^2$ to about 1600 kg/mm$^2$.

The Palmqvist toughness test is an extension of the Vickers test. Preferably, the silicon nitride ceramic bodies of this invention exhibit a Palmqvist toughness at room temperature of at least about 37 kg/mm. Preferably, the Palmqvist toughness at room temperature ranges from about 37 kg/mm to about 52 kg/mm; more preferably, from about 40 kg/mm to about 46 kg/mm.

ILLUSTRATIVE EMBODIMENTS

The following examples serve to illustrate the novel, dense, self-reinforced silicon nitride bodies of this invention and the method of preparing said bodies. The examples are not intended to limit the scope of this invention.

The silicon nitride powder is commercially available from Ube Industries, Ltd. under the trade designation SN-E10. It contains: 1.6 percent oxygen; less than 100 ppm Cl; less than 100 ppm Fe; less than 50 ppm Ca; and less than 50 ppm Al. It has a crystallinity of greater than 99.5 percent, a ratio of $\beta/(\alpha+\beta)$ of less than 5, and a surface area of 11.2 m$^2$/g. Moly Corp supplies yttria, and Baker Incorporated supplies magnesium hydroxide. Zirconia, in the form of zirconia balls, is available from Union Process. Zirconia powder is available from Toyo Soda (type TZ-3Y20A). Titania and alumina powders are available from Alfa Products.

EXAMPLE 1

(a) Colloidal Processing and Pressureless Sintering

A series of silicon nitride greenware is prepared according to a general method that begins by mixing desired amounts of silicon nitride, magnesium hydroxide, silica, yttria, and a whisker growth enhancing compound (titania, alumina, or a combination thereof) in an attritor (Union Process batch attritor, Model 01HD-750 cc capacity with polytetrafluoroethylene coated tube and stirrer) containing zirconia balls and a carrier medium with a stirring rate of 250 revolutions per minute (rpm) for a mixing time of 1 hour to form a slurry. Deionized (DI) water with 0.9 wt-% KV 5088 surfactant is used as the carrier medium in an amount sufficient to provide a solids content of 35 to 40 wt-% solids. The slurry is poured through a 400 (37 μm) mesh plastic sieve to remove the zirconia balls. The slurry is then poured into a slip-casting form positioned on gypsum plaster. The cast is dried at room temperature for 24 hours and then dried under a flow of dry nitrogen gas at a temperature of 80° C. for 24 hours to form dried greenware. Greenware having a size of 2 inches (5.1 cm) in diameter by 1.5 inches (3.8 cm) in width, and 0.5 inch (1.3 cm) in thickness is placed in a graphite crucible filled with a silicon nitride powder bed containing oxides of the same metal components present in the greenware (magnesia, silica, yttria, zirconia, and at least one of either titania or alumina). The greenware is then pressureless sintered for 12 hours in a 4 inch (10.2 cm) ASTRO TM graphite furnace at 1750° C. under a nitrogen atmosphere of 1 atm (0.1 MPa) pressure. Samples prepared by this method are set forth as Samples (a)-(e) in Table I, infra.

(b) Dry Pressing and Pressureless Sintering

Powdered mixtures of silicon nitride, magnesia, silica, yttria, and at least one whisker growth enhancing compound (titania, alumina) are prepared by addition to a methanol slurry and attrition milling. After attrition milling, instead of slip-casting, the sample is dried for 24 hours at 70° C. to provide a dried powder mixture. A sample quantity (80 g) of the dried powder mixture is poured into a stainless steel die 2 inches (5.1 cm) in diameter by 0.5 inch (1.3 cm) in thickness. The powder is dry pressed at room temperature under a pressure of 5 psi (34.5 kPa) and then isostatically pressed at room temperature under a pressure of 45 ksi (310.3 MPa). The resulting pressed disc is placed in a graphite crucible, and the crucible is filled with a silicon nitride powder bed containing oxides of the same metal components present in the greenware. The disc is thereafter sintered as described in Example 1(a), above. Samples prepared by this method are set forth in Table I, infra, as Samples (f)-(i).

The densities of the silicon nitride ceramic bodies, prepared hereinabove, are measured by the water immersion method, as described in "Modern Ceramic Engineering" by D. W. Richerson, Marcel Dekker, 1982, and by sterology analysis from scanning electron microscopy (SEM) photomicrographs with the results shown in Table I. The greenware compositions of Table 1 can be pressureless sintered to form ceramic bodies having densities of at least about 98 percent of theoretical.

TABLE I*

| Sample I.D. | % Si$_3$N$_4$ | % Mg(OH)$_2$ | % MgO | % SiO$_2$ | % Y$_2$O$_3$ | % ZrO$_2$ | % TiO$_2$ | % Al$_2$O$_3$ | Green Density | Sintered Density | Solvent |
|---|---|---|---|---|---|---|---|---|---|---|---|
| a | 92.68 | 2.28 | — | 1.50 | 2.86 | 0.50 | 0.18 | — | 58.7 | 99.9 | Water |
| b | 91.44 | 3.76 | — | 1.50 | 2.62 | 0.50 | 0.18 | — | 57.2 | 98.1 | Water |
| c | 92.48 | 2.28 | — | 1.30 | 2.86 | 0.50 | 0.18 | — | 58.1 | 98.3 | Water |
| d | 92.68 | 2.28 | — | 1.50 | 2.86 | 0.50 | — | 0.18 | 56.9 | 99.3 | Water |
| e | 92.48 | 2.28 | — | 1.30 | 2.86 | 0.50 | — | 0.18 | 57.2 | 99.1 | Water |
| f | 93.53 | — | 1.59 | 1.30 | 2.88 | 0.50 | 0.20 | — | 53.0 | 99.0 | Methanol |
| g | 93.35 | — | 1.59 | 1.50 | 2.88 | 0.50 | — | 0.18 | 52.4 | 98.8 | Methanol |
| h | 93.33 | — | 1.59 | 1.50 | 2.88 | 0.50 | 0.10 | 0.10 | 52.9 | 99.0 | Methanol |
| i | 93.30 | — | 1.59 | 1.50 | 2.88 | 0.55 | 0.18 | — | 53.2 | 99.5 | Methanol |

*Percentages of components are based on weight percent in the powder mixture.

(c) Analysis of Slip-Cast Method and Dry Press Method Phases and Morphology

Samples (a), (d), and (i) each attain densities of 99.9 percent, 99.3 percent, and 99.5 percent of theoretical, respectively. Approximately 35 volume percent of each silicon nitride composition contains elongated grains of β-silicon nitride, the grains having an average aspect ratio of about 2.5 and an average diameter between 0.5 μm and 1.0 μm.

The bulk chemical composition of Samples (a), (d), and (i) is measured by neutron activation analysis. Each contains about 92 wt-% crystalline silicon nitride, about 6 wt-% glassy grain boundary phase, and about 2 wt-% other crystalline phases. The glassy grain boundary phase has an average glass composition, as measured by analytical transition electron microscopy (ATEM), as follows: 37±11 wt-% yttrium, 7±5 wt-% silicon, 6±5 wt-% magnesium, 6±3 wt-% zirconium, 2±1 wt-% aluminum for (d), 2±1 wt-% titanium for both (a) and (i), 39±10 wt-% oxygen, and 3±2 wt-% nitrogen. Traces of calcium oxide impurity, coming from the magnesia, are also detected in the glassy grain boundary phase. A second crystalline phase of zirconia is found in a concentration of 0.1 wt-%. In addition, Samples (a) and (i) have two minor crystalline phases comprising zirconium titanium silicide and zirconium titanium silicon nitride in a total concentration of 2.0 wt-%. Sample (d) has two minor crystalline phases comprising zirconium aluminum silicide and zirconium aluminum silicon nitride in a concentration of 2.0 wt-%.

At room temperature, fracture toughness, flexural strength and Vickers Hardness are measured for Samples (a), (d), and (i). The results are shown in Table II.

TABLE II

| Sample I.D. | Fracture Toughness (Palmqvist test-kg/mm) | Fracture Toughness (Chevron Notch test-MPa · m$^{\frac{1}{2}}$) | Fracture Strength (MPa) | Vickers Hardness (kg/mm$^2$) |
|---|---|---|---|---|
| a | 46.0 | 8.5 | 862 | 1570 |
| d | 44.2 | 8.3 | 827 | 1580 |
| i | 43.3 | 8.0 | 827 | 1550 |

EXAMPLE 2

A series of ceramic bodies is prepared as in Example 1(a), with the exception that the powder mixture comprises 93.3 wt-% silicon nitride, 2.86 wt-% yttria, 2.28 wt-% magnesium hydroxide, 1.30 wt-% silica, 0.20 wt-% titania, and a concentration of zirconia as shown in Table III. It is seen that silicon nitride ceramic bodies having a sintered density of at least about 98 percent of theoretical are prepared by pressureless sintering the powder mixtures of this example. Moreover, it is observed that zirconia is required in an amount ranging from 0.2 percent to 0.5 percent in order to achieve a sintered density above 99.0 percent of theoretical.

TABLE III

| Sample I.D. | Wt. % ZrO$_2$ | % Theor. Density |
|---|---|---|
| a* | 0 | 97.5 |
| b | 0.2 | 99.3 |
| c | 0.5 | 99.5 |
| d | 1.0 | 99.5 |
| e | 2.0 | 99.2 |
| f | 5.0 | 98.4 |

*not an example of the invention

EXAMPLE 3

Two greenware samples are prepared as in Example 1(a), with the exception that one powder mixture comprises: 92.92 wt-% silicon nitride, 2.28 wt-% magnesium hydroxide, 1.50 wt-% silica, 2.86 wt-% yttria, and 0.44 wt-% calcium titanate (CaTiO$_3$); and the other comprises, 92.86 wt-% silicon nitride, 2.28 wt-% magnesium hydroxide, 0.96 wt-% silica, 2.86 wt-% yttria, and 1.04 wt-% calcium silicate (CaSiO$_3$). The compositions are separately attrition mixed with carrier mediums of 135 ml of D.I. water and 1.75 ml of KV 5088 surfactant, providing solids loadings of 35 volume percent. After dispersion, minimal flocculation is observed. It is also observed that replacing either calcium titanate or calcium silicate with calcium oxide leads to flocculation of the powder mixture in the water carrier medium and precludes preparation of greenware via slip casting. The hereinbefore formed slurries are slip cast and dried as described in Example 1(a).

The resulting ceramic greenware casts have green densities of 53.7% and 54.8% of theoretical, respectively. The greenware are then pressureless sintered as described in Example 1(a) to obtain sintered densities of 99.4% and 99.3% of theoretical, respectively.

This example shows that, while calcium oxide cannot be used in a water carrier medium, calcium titanate and calcium silicate introduce both calcium and either titanium or silicon, respectively, into the composition and do not flocculate in water carrier mediums. Similar results are expected with other compositions and process variations, all of which are disclosed in this application.

What is claimed is:

1. A process for preparing a dense, self-reinforced silicon nitride ceramic body by pressureless or low pressure gas sintering, the process comprising subjecting a powder mixture including:

(a) silicon nitride in an amount sufficient to provide a ceramic body;

(b) a combination of a source of magnesium oxide and a source of silicon dioxide, the silicon dioxide being present in an amount sufficient to provide a total silicon dioxide content of at least 3 weight percent, and the combination being present in an amount sufficient to aid densification of the powder;

(c) a source of yttrium oxide in an amount sufficient to promote essentially complete conversion of the silicon nitride to $\beta$-silicon nitride;

(d) a catalytic amount of a source of zirconium oxide; and (e) at least one whisker growth enhancing compound in an amount sufficient to promote the formation of $\beta$-silicon nitride whiskers, said compound(s) being selected from the group consisting of a source of titanium dioxide and a source of aluminum oxide;

to a pressure within a range of from 1 atmosphere (0.1 MPa) to 100 atmospheres (10 MPa) and to a temperature sufficient to provide for densification to a value which is at least 98 percent of theoretical and sufficient to provide in situ formation of $\beta$-silicon nitride whiskers having a high average aspect ratio, such that the ceramic has a fracture toughness greater than about 6.0 MPa.(m)$^{\frac{1}{2}}$ as measured by the Chevron notch technique at 23° C.

2. The process of claim 1 wherein the amount of silicon nitride ranges from about 90 to about 98 weight percent based on total weight of the powder mixture.

3. The process of claim 1 wherein the source(s) of silicon dioxide are present in an amount sufficient to provide a total silicon dioxide content within a range of from about 3.0 to about 5.0 weight percent based on total weight of the powder mixture.

4. The process of claim 1 wherein the source of magnesium oxide is present in an amount sufficient to provide a magnesium oxide content within a range of from about 0.5 to about 3.0 weight percent based on total weight of the powder mixture.

5. The process of claim 1 wherein the amount of the source of yttrium oxide is sufficient to provide a yttrium oxide content within a range of from about 1.0 to about 6.0 weight percent based on total weight of the powder mixture.

6. The process of claim 1 wherein the amount of the source of zirconium oxide is sufficient to provide a zirconium oxide content within a range of from about 0.2 to about 3.0 weight percent based on total weight of the powder mixture.

7. The process of claim 1 wherein the whisker growth enhancing compound content is within a range of from about 0.01 to about 3.0 weight percent based on total weight of the powder mixture.

8. The process of claim 1 wherein the amounts of the sources of yttrium oxide, magnesium oxide, and silicon dioxide provide a weight ratio of yttrium oxide to the combination of magnesium oxide and silicon dioxide that is within a range of from about 2:1 to about 1:8.

9. The process of claim 1 wherein the amounts of the sources of magnesium oxide, silicon dioxide, and zirconium oxide provide a weight ratio of the combination of silicon dioxide and magnesium oxide to zirconium oxide that is within a range of from about 40:1 to about 1:1.

10. The process of claim 1 further comprising a step of forming the powder mixture into greenware prior to sintering.

11. The process of claim 10 wherein the greenware is formed out of a colloidal suspension comprising the powder mixture dispersed in an aqueous carrier medium, each component of the powder mixture being water dispersible and nonflocculating.

12. The process of claim 11 wherein the source of magnesium oxide is magnesium hydroxide.

13. The process of claim 11 wherein the aqueous carrier medium is admixed with a surfactant.

14. A silicon nitride ceramic body having a density which is at least 98 percent of theoretical value and a toughness greater than about 6.0 MPa.(m)$^{\frac{1}{2}}$ as measured by the Chevron notch technique at 23° C., comprising:

(a) a crystalline phase of $\beta$-silicon nitride of which at least about 20 volume percent, as measured by viewing one plane of the silicon nitride ceramic body by scanning electron microscopy, is present as whiskers having an average aspect ratio of at least about 2.5;

(b) a glassy grain boundary phase, in an amount ranging from about 2 to about 10 weight percent, based on total weight of the composition, comprising oxygen, nitrogen, magnesium, yttrium, silicon, zirconium, and at least one metal selected from the group consisting of titanium and aluminum;

(c) a second crystalline phase comprising zirconium oxide, in an amount ranging from about 0.1 to about 3.0 weight percent based on total weight of the composition; and (d) at least one additional crystalline phase in an amount ranging from 0.1 to about 3.0 weight percent based on total weight of the composition, the additional phase(s) comprising metal zirconium silicide and metal zirconium silicon nitride, wherein the metal is selected from the group consisting of titanium and aluminum.

15. The body of claim 14 wherein the glassy grain boundary phase contains magnesium, silicon, yttrium, zirconium, titanium, oxygen, and nitrogen, and wherein two other crystalline phases of titanium zirconium silicide and titanium zirconium silicon nitride are present.

16. The body of claim 14 wherein the glassy grain boundary phase contains magnesium, silicon, yttrium, zirconium, aluminum, oxygen, and nitrogen, and wherein two other crystalline phases of aluminum zirconium silicide and aluminum zirconium silicon nitride are present.

17. An article of manufacture prepared from the body of claim 14.

* * * * *